United States Patent [19]

Gelfand

[11] Patent Number: 4,578,785

[45] Date of Patent: Mar. 25, 1986

[54] TWO-COMPONENT ACOUSTIC BOREHOLE TOOL

[75] Inventor: Valery A. Gelfand, Houston, Tex.

[73] Assignee: Western Geophysical Company of America, Houston, Tex.

[21] Appl. No.: 501,614

[22] Filed: Jun. 6, 1983

[51] Int. Cl.$^4$ .......................... G01V 1/40; E21B 47/00
[52] U.S. Cl. ..................................... 367/35; 181/105; 367/911; 166/250
[58] Field of Search .......................... 367/33, 35, 911; 181/105; 166/250, 65 R; 73/152

[56] References Cited

U.S. PATENT DOCUMENTS

| | | | |
|---|---|---|---|
| 2,846,662 | 12/1982 | Bright | 166/214 |
| 4,082,144 | 4/1978 | Marquis | 166/250 |
| 4,349,072 | 9/1982 | Escaron et al. | 166/250 |
| 4,365,668 | 8/1958 | Sparks | 166/214 |
| 4,450,539 | 5/1984 | Bright | 367/35 |

OTHER PUBLICATIONS

The Vertical Array in Reflection Seismology-Some Experimental Studies, Wuenschel, Paul C., *Geophysics*, vol. 41, No. 2, pp. 219-232.

Vertical Seismic Profiling, Gal'Perin, Published by Society of Exploration Geophysicists, Tulsa, OK, 1974.

*Primary Examiner*—Nelson Moskowitz
*Assistant Examiner*—Ian J. Lobo
*Attorney, Agent, or Firm*—William A. Knox

[57] ABSTRACT

An acoustic borehole tool consists of two components: A first component containing power supplies, signal processing and control electronics and a sidewall locking mechanism. A second component includes a seismic sensor and a clamping device for pressing the sensor against the sidewall of a borehole. The weight of the second component is a small fraction of the weight of the first component so that the force exerted by the clamping device is less than a preselected limiting value and so that the clamping force/mass ratio may reach large value without danger of destroying the borehole.

3 Claims, 3 Drawing Figures 4,578,785

TWO-COMPONENT ACOUSTIC BOREHOLE TOOL

BACKGROUND OF THE INVENTION

1. Field of the Invention

This invention relates to acoustic logging tools for use in a borehole and more particularly to a tool designed specifically for use in conjunction with vertical seismic profiling.

2. Discussion of the Prior Art

Vertical seismic profiling (VSP) is a special technique that is used in seismic exploration. In conventional seismic work on land, a plurality of seismic sensors or geophones are distributed at designated stations along a line of survey in a substantially horizontal plane at or near the surface of the earth. The respective sensor or sensor arrays are connected to a set of individual amplifier channels, such as 96, wherein the sensor signals are processed and recorded. An acoustic source in the vicinity of the line of sensors generates seismic waves. The seismic waves propagate downwardly and become reflected from various subsurface earth layers. The reflected seismic waves return to the surface where they are detected by the sensors as useful seismic signals.

The sensors are sensitive to any slight earth motion, usually the vertical component thereof. For most conventional exploration projects, the amplitude of the geophone signal is proportional to particle velocity although accelerometers sometimes may be used. The useful reflected seismic signals may be expected to be contaminated with noise from various sources such as wind, traffic, footfalls of man or beast, earth unrest and the like. Further, the useful signals may become distorted during their travel through the unconsolidated or weathered earth layer that nearly always overlies the more competent earth formations that lie below. Another source of noise arises from the scattering of the acoustic signals due to small inhomogeneities at or near the earth's surface or to heterogeneities in elastic constants of the layers themselves.

In VSP operations, a seismic sensor such as a geophone or a short array of geophones is successively made to occupy designated stations in a vertical line underneath the surface of the earth. A plurality of acoustic sources are distributed at or near the surface of the earth along a line of survey in a substantially horizontal plane. At each selected depth station the respective sources are triggered in turn, to generate a seismic wave. The respective seismic wave of course, is reflected from subsurface earth layers and is received by the sensor in the borehole. Because the sensor or sensor array may be placed below the earth layers containing the signal scatterers or noise generators, the sensor reposes in a quiet environment, resulting in an improved signal-to-noise ratio. The main advantage however, of a VSP survey is the capability for the direct identification of the propagation modes of seismic signals within the earth. That capability provides us with a better understanding of primary and multiple events as seen from a conventional surface survey; it permits us to more positively separate primary and multiple events for the purpose of multiple suppression. In areas of complex structure and topography, the lateral continuity of desired signals is more easily established. Finally the attenuation of elastic waves in earth materials may be studied. Additional information regarding VSP methods may be gleaned from a paper entitled "The Vertical Array in Reflection Seismology—Some Experimental Studies" by Paul C. Wuenschel published in *Geophysics* V. 41, No. 2, pp. 219–232. Another useful study is "Vertical Seismic Profiling" by Gal'perin, published by the Society of Exploration Geophysicists, Tulsa, OK.

While it is true that in the conduct of VSP, the seismic sensor may be removed from surface-noise contamination, there are other noise sources that are peculiar to VSP. Some undesired wave forms include tube waves, signals transmitted through the cable supporting the geophone array, multiple reflected waves generated at the bottom of the borehole, and spurious signals transmitted through the drilling fluid in the hole. I have found that tube waves are particularly troublesome. The velocity contrast between the drilling fluid in the borehole and the rock formations that form the borehole wall is sufficiently large that the borehole acts like an acoustic waveguide. A tube wave therefore propagates along the borehole virtually unattenuated. As a noise source, tube waves seriously contaminate the desired reflected waves.

Typically, for VSP work, the sensor or sensor array is mounted in a tool or sonde. The sonde may be lowered into a borehole from a suitable cable by a winch located at the mouth of the hole. The cable may include a stress member and various conductors for reception of seismic sensor signals, transmission of control signals and the like. Most downhole tools include means for locking and unlocking the tool relative to the sidewall of the hole. See for example U.S. Pat. Nos. 2,846,662; 4,365,668; or the previously cited paper by Wuenschel. Usually, the tool contains electronic circuitry, power supplies, and locking control mechanisms as well as a heavy pressure-proof housing so that the tool is quite heavy—200 pounds or more.

It is well known that rigid coupling of the borehole tool to the sidewall of the hole is essential. For example, see Gal'perin, p. 24. The borehole tool is suspended vertically, parallel to the sidewall of the hole. The vertical component of earth motion is transferred to the tool and its contained sensor by a tangential force caused by the propagating body wave. The frictional force between the sidewall and the tool determines the efficiency of transfer of the body waves to the tool and hence the amplitude of the resulting seismic signals. The minimal required frictional force F to prevent sliding of the borehole tool is equal to m*a where "m" is the tool mass and "a" is the acceleration of the borehole wall. If F<m*a, the tool creeps. Since F is proportional to the clamping force and the coefficient of friction and "a" is proportional to signal frequency, we see that creep results in loss of high-frequency signals, generates frictional noise, and allows detection of undesired tube waves.

Earlier workers in the art such as Gal'perin, recommend that the ratio of clamping force relative to borehole tool mass should be greater than unity and preferably up to three times the mass of the tool. Thus for a 200-pound tool, a clamping force of at least 600 pounds is needed. At the same time, once the tool is clamped, the hoisting cable can be slaced off to eliminate cable waves.

I have found that the influence of tube waves is reduced in direct proportion to an increase in the ratio between the clamping force and the weight of the tool. However, there is a practical safe limit to the magnitude of the clamping force that can be applied. Too much force will cause the borehole sidewall to spall if the hole is uncased and such force is capable of rupturing the liner if the hole is cased.

I have also found that the required clamping force for the sensor varies as a function of the type of formations encountered and the resulting local coefficient of friction. A low clamping force/mass ratio that may prevent static creep is not at all adequate to prevent creep under the dynamic conditions of signal propagation, particularly at high frequencies. The clamping-force/mass ratio must be substantially greater than unity; that is, the ratio should be 10:1 or more.

SUMMARY OF THE INVENTION

It is an object of this invention to reduce the radial clamping force required to press a seismic sensor against a borehole sidewall by reducing the weight of the sensor itself so that a high clamping force/mass ratio, substantially greater than unity can be maintained while keeping the total force below a safe level to prevent borehole damage.

In accordance with an aspect of this invention, I separate the seismic sensor from the remainder of the borehole tool and compliantly suspend the sensor therefrom. The sensor and the body of the borehole tool are each provided with separate clamping devices.

In accordance with a further aspect of this invention, the mass of the sensor and housing is reduced so that a high clamping-force to mass ratio may be maintained without applying a clamping force that exceeds a preselected upper limit.

In accordance with an aspect of this invention, I separate an acoustic borehole tool into two parts: A first module containing signal-receiving electronics and control circuitry and a locking mechanism, including means for hoisting-cable attachment; a second module including a seismic sensor and clamping device for urging the sensor against the side wall of a borehole.

In accordance with another aspect of this invention, the second module is nestable within and ejectable from an end of the first module.

In a preferred embodiment of this invention, the mass of the second module is a small fraction of the mass of the first module so that minimal force is required to clamp the sensor to the borehole sidewall.

In accordance with an aspect of this invention, the second module is interconnected with the first module by a compliant suspension thereby to isolate the second module from the mass of the first module and from disturbances created by creep of the first module.

BRIEF DESCRIPTION OF THE DRAWINGS

A better understanding of the benefits and advantages of my invention may be had from the appended detailed description and the drawings, where.

DETAILED DESCRIPTION OF A PREFERRED EMBODIMENT

Figure 1:
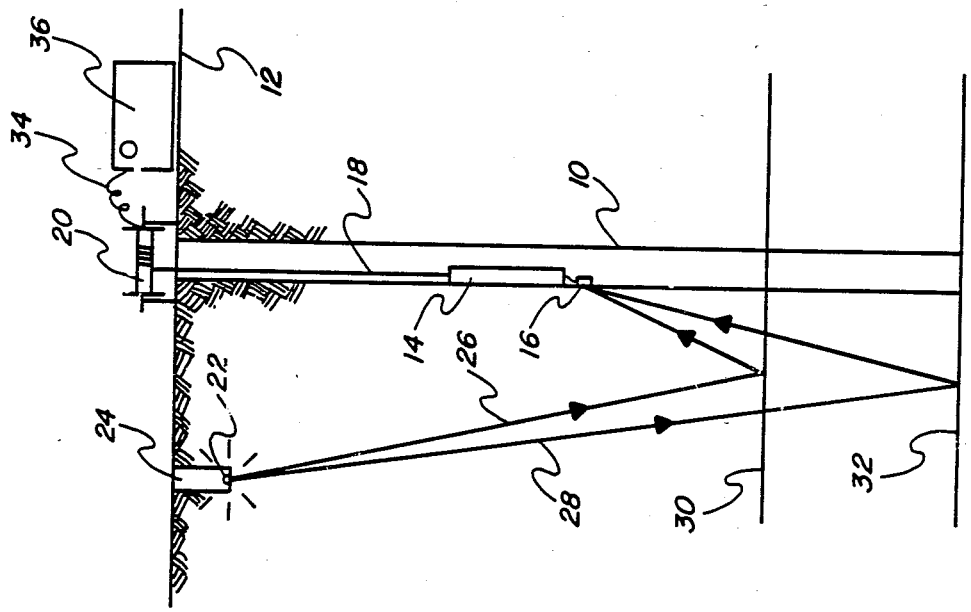
FIG. 1 is a schematic view of the method of vertical seismic profiling.

Referring now to FIG. 1, there is shown a borehole 10 drilled beneath the surface of the earth 12 to a desired depth which may be two miles or more. An acoustic borehole tool 14 including a seismic sensor 16 secured below it, is suspended from a hoisting cable 18 and is lowered into borehole 10 by winch 20 of any well known type. A source of acoustic waves such as a small charge of dynamite 22 is fired in a shot hole 24. Seismic waves such as are represented by rays 26 and 28 propagate downwardly and are reflected from earth layers 30 and 32. The reflected waves are then received by seismic sensor 16. The resulting electrical signals are transmitted up hoisting cable 18 through suitable conductors 34 to a signal processing and recording device 36.

Figure 2:
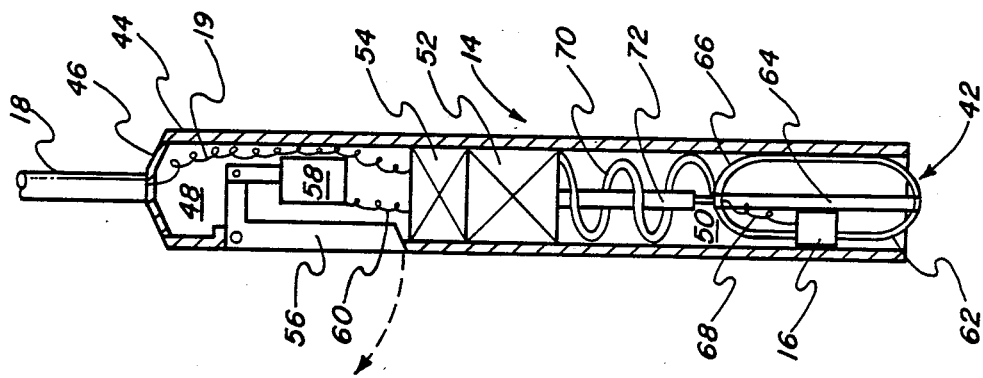
FIG. 2 is a cutaway view of the borehole tool.

FIG. 2 is a cutaway view of the essential parts of a preferred borehole tool. The tool consists of two modules, a first upper module 14 and a second module 42 which, in FIG. 2 is shown nested inside one end of the first module 14.

First module 14 consists of an outer pressure housing 44 having a closed end cap 46 for receiving and fastening a hoisting cable 18. Cable 18 includes a multiconductor electrical cable 19 for transmitting control signals to the tool and for transmitting seismic sensor signals to the processing equipment 36 via conductors 34. The pressure housing 44 is divided into an upper chamber 48 and a lower chamber 50. Upper chamber 48 includes a power supply package 52 and a control and electronics package 54, both of which are sealed against the ambient borehole pressure but are otherwise conventional. A hinged locking arm 56 may be actuated upon command by a solenoid 58 or other device, to swing outwardly against the borehole sidewall as shown by the arrow to lock module 14 at a selected level in the borehole. Solenoid 58 receives control signals from control and electronics package 54 over conductors 60. The locking assembly per se is conventional and may be modeled after the sidewall clamps as taught by U.S. Pat. Nos. 4,365,668 or 2,846,662.

Second module 42 may consist mainly of a three- or four-leaf spider of flat spring material as 62, 64, 66. A seismic sensor 16 or an array of sensors may be mounted on or in one leaf of the spider. The spider leaves are designed to expand radially so as to press the seismic sensor firmly against the sidewall of the borehole. The sensor is designed to be as light weight as possible so that the ratio between the clamping force exerted by the spider spring leaves and the mass of sensor 16 is a preselected value greater than unity, yet the total lateral force exerted by the leaves 62, 64, 66 of module 42 will remain below a preselected safe limit. By "lightweight" is meant that module 42 might weigh about 10 pounds as opposed to the nearly 200-pound weight of module 14. That is, the weight of the second module is a small fraction of the weight of the first module.

Signals from sensor 16 are transmitted through leads 68 and compliant conductive member 70 to electronics and control package 54 where the signals are preamplified for transmission to multiconductor cable 19 whence the sensor signals are transmitted to recording apparatus 36 via cable 34 as shown in FIG. 1.

In operation, the borehole tool is armed by inserting second module 42 into the open lower end of first module 14. The lateral force exerted by the spider-leaves holds second module 42 in place. Compliant member 70 is of course, coiled inside module 14, above module 42. The borehole tool is then lowered to a desired station near the bottom of the borehole 10. At that point a command is sent by an operator through cable 19 to a plunger 72, which may be an electrically-powered linear actuator of any well known type, to push or eject second module 42 from the lower open end of first module 14. Second module 42 remains mechanically and electrically coupled to first module 14 by compliant member 70. Compliant member 70 may be made of nylon, rubber or similar material that is strong, flexible, and capable of moderate elongation under tension. Electrical conductors may be woven into the compliant member 70 such as taught by U.S. Pat. No. 2,456,015.

Figure 3:
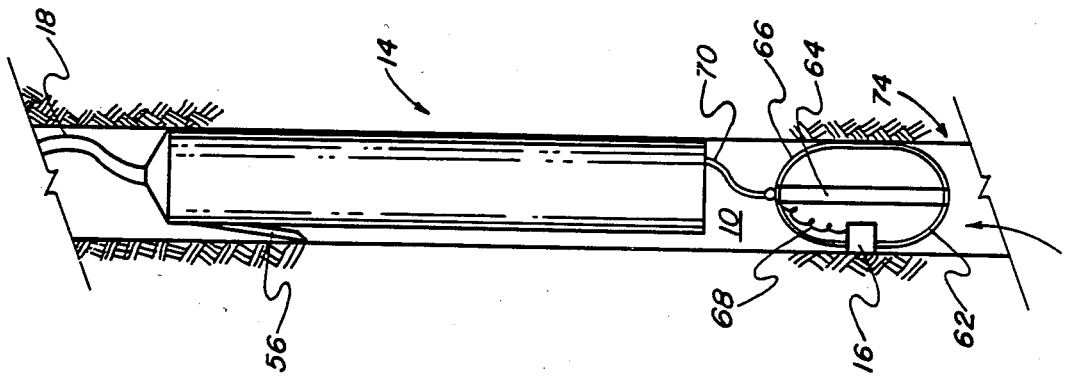
FIG. 3 shows the method of deployment of the tool in a borehole.

Once second module 42 has been ejected from module 14, the spider leaves 62, 64, 66 expand against the sidewall 74 of borehole 10; see FIG. 3. The clamping force exerted by the spider leaves, clamps sensor 16 firmly against the sidewall, thus holding module 42 in place. First module 14 is then raised a little bit by cable 18 to make sure that the two modules are properly separated by a desired distance such as two or three feet. Thereupon, a second signal sent by the operator through multiconductor signal and control cable 19, which is part of hoisting cable 18, acutates locking arm 56 to bear against the borehole sidewall to clamp first module 14 in place. During the locking process, module 14 will inherently slip or creep downwardly by a small amount. That inherent creep effect is desirable because the creep will allow the compliant member to become slack as shown in FIG. 3, thus isolating sensor 16 more effectively from mechanical noises that might be generated by module 14. To eliminate cable noise, hoisting cable 18 is also slackened off as shown in the figure. Once the two modules are locked in place, the seismic sound source or sources may be actuated as described in connection with FIG. 1.

After the desired seismic recordings have been completed at a first designated station, locking arm 56 is withdrawn and the two modules are raised by hoisting cable 18 to the next designated station. It should be understood that the clamping force exerted by spider arms 62, 64, 66, although great enough to clamp sensor 16 to the sidewall 74, it is not so great that second module 42 cannot be raised without undue strain while in gliding contact with the sidewall. When in position at a second designated station the above-discussed cable-slackening and module-locking process is repeated. As many stations as desired may be occupied by the borehole tool as it is hoisted back up to the surface.

The discussion supra is exemplary only. It may be desirable, for example, to provide means to retract module 42 into module 40 by remote control from the surface. It is also possible to configure the sonde assembly so that module 42 is external to module 14 and the clamping device of module 42 is activated by signal from the surface. Many different types of locking devices may be devised for both modules as will be recognized by those skilled in the art but which lie within the scope and spirit of this invention which is limited only by the appended claims.

I claim as my invention:

1. A method of manipulating a borehole tool in a borehole, comprising the steps of:
    (a) providing a first module containing signal receiving and control electronics;
    (b) nesting a second module in said first module, said second module being light-weight compared to said first module, said second module including a seismic sensor;
    (c) Compliantly coupling, electrically and mechanically, said second module to said first module;
    (d) Suspending said first module and said second nested module in a borehole at a first operator selected station, by a suspending means;
    (e) ejecting said nested second module from said first module;
    (f) clamping said sensor against the sidewall of said borehole;
    (g) separating said first module from said ejected second module;
    (h) locking sad first module to the sidewall of said borehole thereby to acoustically isolate said second module from said first module;
    (i) slacking said suspending means; and
    (j) repeating steps (f) through (i) at a plurality of operator-selected stations at different depths in said borehole.

2. The method as defined by claim 1, comprising the further steps of:
applying a clamping force to said seismic sensor of said second module such that the ratio between said clamping force and the mass of said second module is substantially greater than unity.

3. An acoustic borehole tool for use in vertical seismic profiling in a borehole, comprising:
a first module;
a light-weight second module including a seismic sensor said second module being ejectably nestable in said first module and including means for complaintly interconnecting, electrically and mechanically, said second module with said first module;
means for separately clamping said first module and said second module to the sidewall of a borehole, the ratio between the clamping force and the mass of said second module being substantially greater than unity and the net clamping force is less than a preselected upper limit that depends upon the physical characteristics of the borehole sidewall formation;
means for acoustically isolating said second module from said first module; and
means for isolating said first module from undesired acoustic waves.

* * * * *